(12) United States Patent
George et al.

(10) Patent No.: US 10,222,986 B2
(45) Date of Patent: Mar. 5, 2019

(54) TENANT-LEVEL SHARDING OF DISKS WITH TENANT-SPECIFIC STORAGE MODULES TO ENABLE POLICIES PER TENANT IN A DISTRIBUTED STORAGE SYSTEM

(71) Applicant: CISCO TECHNOLOGY, INC., San Jose, CA (US)

(72) Inventors: Johnu George, San Jose, CA (US); Kai Zhang, San Jose, CA (US); Yathiraj B. Udupi, San Jose, CA (US); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/713,851

(22) Filed: May 15, 2015

(65) Prior Publication Data

US 2016/0334998 A1 Nov. 17, 2016

(51) Int. Cl.
*G06F 3/06* (2006.01)
*G06F 17/30* (2006.01)

(52) U.S. Cl.
CPC ............ *G06F 3/0608* (2013.01); *G06F 3/067* (2013.01); *G06F 3/0631* (2013.01); *G06F 3/0644* (2013.01); *G06F 17/30914* (2013.01)

(58) Field of Classification Search
CPC ......... G06F 17/30914; H04L 29/08072; H04L 29/06
See application file for complete search history.

(56) References Cited

U.S. PATENT DOCUMENTS 4,688,695 A 8/1987 Hirohata
5,263,003 A 11/1993 Cowles et al.
(Continued)

FOREIGN PATENT DOCUMENTS

EP 2228719 9/2010
EP 2439637 4/2012
(Continued)

OTHER PUBLICATIONS

Sage A. Weil, "Ceph: Reliable, Scalable, and High-Performance Distributed Storage," University of California, Santa Cruz, Dec. 2007.*
(Continued)

*Primary Examiner* — Midys Rojas
*Assistant Examiner* — Khoa D Doan
(74) *Attorney, Agent, or Firm* — Polsinelli PC

(57) ABSTRACT

Embodiments include receiving an indication of a data storage module to be associated with a tenant of a distributed storage system, allocating a partition of a disk for data of the tenant, creating a first association between the data storage module and the disk partition, creating a second association between the data storage module and the tenant, and creating rules for the data storage module based on one or more policies configured for the tenant. Embodiments further include receiving an indication of a type of subscription model selected for the tenant, and selecting the disk partition to be allocated based, at least in part, on the subscription model selected for the tenant. More specific embodiments include generating a storage map indicating the first association between the data storage module and the disk partition and indicating the second association between the data storage module and the tenant.

20 Claims, 4 Drawing Sheets

(56) References Cited

U.S. PATENT DOCUMENTS

| | | | |
|---|---|---|---|
| 5,339,445 A | 8/1994 | Gasztonyi | |
| 5,430,859 A | 7/1995 | Norman et al. | |
| 5,457,746 A * | 10/1995 | Dolphin | G06F 12/1408 |
| | | | 380/279 |
| 5,535,336 A | 7/1996 | Smith et al. | |
| 5,588,012 A | 12/1996 | Oizumi | |
| 5,617,421 A | 4/1997 | Chin et al. | |
| 5,680,579 A | 10/1997 | Young et al. | |
| 5,690,194 A | 11/1997 | Parker et al. | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,812,814 A | 9/1998 | Sukegawa | |
| 5,812,950 A | 9/1998 | Tom | |
| 5,838,970 A | 11/1998 | Thomas | |
| 5,999,930 A | 12/1999 | Wolff | |
| 6,035,105 A | 3/2000 | McCloghrie et al. | |
| 6,043,777 A | 3/2000 | Bergman et al. | |
| 6,101,497 A | 8/2000 | Ofek | |
| 6,148,414 A | 11/2000 | Brown et al. | |
| 6,185,203 B1 | 2/2001 | Berman | |
| 6,188,694 B1 | 2/2001 | Fine et al. | |
| 6,202,135 B1 | 3/2001 | Kedem et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,219,753 B1 | 4/2001 | Richardson | |
| 6,223,250 B1 | 4/2001 | Yokono | |
| 6,226,771 B1 | 5/2001 | Hilla et al. | |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 6,400,730 B1 | 6/2002 | Latif et al. | |
| 6,408,406 B1 | 6/2002 | Parris | |
| 6,542,909 B1 | 4/2003 | Tamer et al. | |
| 6,542,961 B1 | 4/2003 | Matsunami et al. | |
| 6,553,390 B1 | 4/2003 | Gross et al. | |
| 6,564,252 B1 * | 5/2003 | Hickman | G06F 9/5061 |
| | | | 709/214 |
| 6,647,474 B2 | 11/2003 | Yanai et al. | |
| 6,675,258 B1 | 1/2004 | Bramhall et al. | |
| 6,683,883 B1 | 1/2004 | Czeiger et al. | |
| 6,694,413 B1 | 2/2004 | Mimatsu et al. | |
| 6,708,227 B1 | 3/2004 | Cabrera et al. | |
| 6,715,007 B1 | 3/2004 | Williams et al. | |
| 6,728,791 B1 | 4/2004 | Young | |
| 6,772,231 B2 | 8/2004 | Reuter et al. | |
| 6,820,099 B1 | 11/2004 | Huber et al. | |
| 6,847,647 B1 | 1/2005 | Wrenn | |
| 6,848,759 B2 | 2/2005 | Doornbos et al. | |
| 6,850,955 B2 | 2/2005 | Sonoda et al. | |
| 6,876,656 B2 | 4/2005 | Brewer et al. | |
| 6,880,062 B1 | 4/2005 | Ibrahim et al. | |
| 6,898,670 B2 | 5/2005 | Nahum | |
| 6,907,419 B1 | 6/2005 | Pesola et al. | |
| 6,912,668 B1 | 6/2005 | Brown et al. | |
| 6,952,734 B1 | 10/2005 | Gunlock et al. | |
| 6,976,090 B2 | 12/2005 | Ben-Shaul et al. | |
| 6,978,300 B1 | 12/2005 | Beukema et al. | |
| 6,983,303 B2 | 1/2006 | Pellegrino et al. | |
| 6,986,015 B2 | 1/2006 | Testardi | |
| 6,986,069 B2 | 1/2006 | Oehler et al. | |
| 7,051,056 B2 | 5/2006 | Rodriguez-Rivera et al. | |
| 7,069,465 B2 | 6/2006 | Chu et al. | |
| 7,073,017 B2 | 7/2006 | Yamamoto | |
| 7,108,339 B2 | 9/2006 | Berger | |
| 7,149,858 B1 | 12/2006 | Kiselev | |
| 7,171,514 B2 | 1/2007 | Coronado et al. | |
| 7,171,668 B2 | 1/2007 | Molloy et al. | |
| 7,174,354 B2 | 2/2007 | Andreasson | |
| 7,200,144 B2 | 4/2007 | Terrell et al. | |
| 7,222,255 B1 | 5/2007 | Claessens et al. | |
| 7,237,045 B2 | 6/2007 | Beckmann et al. | |
| 7,240,188 B2 | 7/2007 | Takata et al. | |
| 7,246,260 B2 | 7/2007 | Brown et al. | |
| 7,266,718 B2 | 9/2007 | Idei et al. | |
| 7,269,168 B2 | 9/2007 | Roy et al. | |
| 7,277,431 B2 | 10/2007 | Walter et al. | |
| 7,277,948 B2 | 10/2007 | Igarashi et al. | |
| 7,305,658 B1 * | 12/2007 | Hamilton | G06F 8/65 |
| | | | 707/999.009 |
| 7,328,434 B2 | 2/2008 | Swanson et al. | |
| 7,340,555 B2 | 3/2008 | Ashmore et al. | |
| 7,346,751 B2 | 3/2008 | Prahlad et al. | |
| 7,352,706 B2 | 4/2008 | Klotz et al. | |
| 7,353,305 B2 | 4/2008 | Pangal et al. | |
| 7,359,321 B1 | 4/2008 | Sindhu et al. | |
| 7,383,381 B1 | 6/2008 | Faulkner et al. | |
| 7,403,987 B1 | 7/2008 | Marinelli et al. | |
| 7,433,326 B2 | 10/2008 | Desai et al. | |
| 7,433,948 B2 | 10/2008 | Edsall | |
| 7,434,105 B1 | 10/2008 | Rodriguez-Rivera et al. | |
| 7,441,154 B2 | 10/2008 | Klotz et al. | |
| 7,447,839 B2 | 11/2008 | Uppala | |
| 7,487,321 B2 | 2/2009 | Muthiah et al. | |
| 7,500,053 B1 | 3/2009 | Kavuri et al. | |
| 7,512,744 B2 | 3/2009 | Banga et al. | |
| 7,542,681 B2 | 6/2009 | Cornell et al. | |
| 7,558,872 B1 | 7/2009 | Senevirathne et al. | |
| 7,587,570 B2 | 9/2009 | Sarkar et al. | |
| 7,631,023 B1 | 12/2009 | Kaiser et al. | |
| 7,643,505 B1 | 1/2010 | Colloff | |
| 7,654,625 B2 | 2/2010 | Amann et al. | |
| 7,657,796 B1 | 2/2010 | Kaiser et al. | |
| 7,668,981 B1 | 2/2010 | Nagineni et al. | |
| 7,669,071 B2 | 2/2010 | Cochran et al. | |
| 7,689,384 B1 | 3/2010 | Becker | |
| 7,694,092 B2 | 4/2010 | Mizuno | |
| 7,697,554 B1 | 4/2010 | Ofer et al. | |
| 7,706,303 B2 | 4/2010 | Bose et al. | |
| 7,707,481 B2 | 4/2010 | Kirschner et al. | |
| 7,716,648 B2 | 5/2010 | Vaidyanathan et al. | |
| 7,752,360 B2 | 7/2010 | Galles | |
| 7,757,059 B1 | 7/2010 | Ofer et al. | |
| 7,774,329 B1 * | 8/2010 | Peddy | G06Q 30/02 |
| | | | 707/705 |
| 7,774,839 B2 | 8/2010 | Nazzal | |
| 7,793,138 B2 | 9/2010 | Rastogi et al. | |
| 7,840,730 B2 | 11/2010 | D'Amato et al. | |
| 7,843,906 B1 | 11/2010 | Chidambaram et al. | |
| 7,895,428 B2 | 2/2011 | Boland, IV et al. | |
| 7,904,599 B1 | 3/2011 | Bennett | |
| 7,930,494 B1 | 4/2011 | Goheer et al. | |
| 7,975,175 B2 | 7/2011 | Votta et al. | |
| 7,979,670 B2 | 7/2011 | Saliba et al. | |
| 7,984,259 B1 | 7/2011 | English | |
| 8,031,703 B2 | 10/2011 | Gottumukkula et al. | |
| 8,032,621 B1 | 10/2011 | Upalekar et al. | |
| 8,051,197 B2 | 11/2011 | Mullendore et al. | |
| 8,086,755 B2 | 12/2011 | Duffy, IV et al. | |
| 8,161,134 B2 | 4/2012 | Mishra et al. | |
| 8,196,018 B2 | 6/2012 | Forhan et al. | |
| 8,205,951 B2 | 6/2012 | Boks | |
| 8,218,538 B1 | 7/2012 | Chidambaram et al. | |
| 8,230,066 B2 | 7/2012 | Heil | |
| 8,234,377 B2 | 7/2012 | Cohn | |
| 8,266,238 B2 | 9/2012 | Zimmer et al. | |
| 8,272,104 B2 | 9/2012 | Chen et al. | |
| 8,274,993 B2 | 9/2012 | Sharma et al. | |
| 8,290,919 B1 * | 10/2012 | Kelly | G06F 17/30097 |
| | | | 707/698 |
| 8,297,722 B2 | 10/2012 | Chambers et al. | |
| 8,301,746 B2 | 10/2012 | Head et al. | |
| 8,335,231 B2 | 12/2012 | Kloth et al. | |
| 8,341,121 B1 | 12/2012 | Claudatos et al. | |
| 8,345,692 B2 | 1/2013 | Smith | |
| 8,352,941 B1 * | 1/2013 | Protopopov | G06F 9/45558 |
| | | | 718/1 |
| 8,392,760 B2 | 3/2013 | Kandula et al. | |
| 8,442,059 B1 | 5/2013 | de la Iglesia et al. | |

(56) References Cited

U.S. PATENT DOCUMENTS

| | | | |
|---|---|---|---|
| 8,479,211 B1* | 7/2013 | Marshall | G06F 11/14 707/770 |
| 8,495,356 B2 | 7/2013 | Ashok et al. | |
| 8,514,868 B2 | 8/2013 | Hill | |
| 8,532,108 B2 | 9/2013 | Li et al. | |
| 8,560,663 B2 | 10/2013 | Baucke et al. | |
| 8,619,599 B1 | 12/2013 | Even | |
| 8,626,891 B2* | 1/2014 | Guru | H04L 67/125 370/468 |
| 8,630,983 B2 | 1/2014 | Sengupta et al. | |
| 8,660,129 B1 | 2/2014 | Brendel et al. | |
| 8,661,299 B1 | 2/2014 | Ip | |
| 8,677,485 B2 | 3/2014 | Sharma et al. | |
| 8,683,296 B2 | 3/2014 | Anderson et al. | |
| 8,706,772 B2* | 4/2014 | Hartig | G06F 21/52 370/395.53 |
| 8,719,804 B2 | 5/2014 | Jain | |
| 8,725,854 B2 | 5/2014 | Edsall | |
| 8,768,981 B1* | 7/2014 | Milne | G06F 17/30194 707/822 |
| 8,775,773 B2* | 7/2014 | Acharya | G06F 3/0605 711/203 |
| 8,793,372 B2 | 7/2014 | Ashok et al. | |
| 8,805,918 B1 | 8/2014 | Chandrasekaran et al. | |
| 8,805,951 B1 | 8/2014 | Faibish et al. | |
| 8,832,330 B1 | 9/2014 | Lancaster | |
| 8,855,116 B2 | 10/2014 | Rosset et al. | |
| 8,856,339 B2 | 10/2014 | Mestery et al. | |
| 8,868,474 B2 | 10/2014 | Leung et al. | |
| 8,887,286 B2 | 11/2014 | Dupont et al. | |
| 8,898,385 B2 | 11/2014 | Jayaraman et al. | |
| 8,909,928 B2 | 12/2014 | Ahmad et al. | |
| 8,918,510 B2 | 12/2014 | Gmach et al. | |
| 8,918,586 B1 | 12/2014 | Todd et al. | |
| 8,924,720 B2 | 12/2014 | Raghuram et al. | |
| 8,930,747 B2 | 1/2015 | Levijarvi et al. | |
| 8,935,500 B1 | 1/2015 | Gulati et al. | |
| 8,949,677 B1 | 2/2015 | Brundage et al. | |
| 8,996,837 B1* | 3/2015 | Bono | G06F 3/0614 711/114 |
| 9,003,086 B1 | 4/2015 | Schuller et al. | |
| 9,007,922 B1 | 4/2015 | Mittal et al. | |
| 9,009,427 B2 | 4/2015 | Sharma et al. | |
| 9,009,704 B2* | 4/2015 | McGrath | G06F 9/455 718/1 |
| 9,053,167 B1* | 6/2015 | Swift | G06F 17/30575 |
| 9,075,638 B2 | 7/2015 | Barnett et al. | |
| 9,141,554 B1 | 9/2015 | Candelaria | |
| 9,141,785 B2* | 9/2015 | Mukkara | G06F 21/53 |
| 9,164,795 B1 | 10/2015 | Vincent | |
| 9,176,677 B1* | 11/2015 | Fradkin | G06F 3/00 |
| 9,201,704 B2 | 12/2015 | Chang et al. | |
| 9,203,784 B2 | 12/2015 | Chang et al. | |
| 9,207,882 B2 | 12/2015 | Rosset et al. | |
| 9,207,929 B2 | 12/2015 | Katsura | |
| 9,213,612 B2 | 12/2015 | Candelaria | |
| 9,223,564 B2 | 12/2015 | Munireddy et al. | |
| 9,223,634 B2 | 12/2015 | Chang et al. | |
| 9,244,761 B2 | 1/2016 | Yekhanin et al. | |
| 9,250,969 B2 | 2/2016 | Lager-Cavilla et al. | |
| 9,264,494 B2 | 2/2016 | Factor et al. | |
| 9,270,754 B2 | 2/2016 | Iyengar et al. | |
| 9,280,487 B2 | 3/2016 | Candelaria | |
| 9,304,815 B1 | 4/2016 | Vasanth et al. | |
| 9,313,048 B2 | 4/2016 | Chang et al. | |
| 9,374,270 B2 | 6/2016 | Nakil et al. | |
| 9,378,060 B2 | 6/2016 | Jansson et al. | |
| 9,396,251 B1 | 7/2016 | Boudreau et al. | |
| 9,448,877 B2 | 9/2016 | Candelaria | |
| 9,471,348 B2 | 10/2016 | Zuo et al. | |
| 9,501,473 B1 | 11/2016 | Kong et al. | |
| 9,503,523 B2 | 11/2016 | Rosset et al. | |
| 9,565,110 B2 | 2/2017 | Mullendore et al. | |
| 9,575,828 B2 | 2/2017 | Agarwal et al. | |
| 9,582,377 B1 | 2/2017 | Dhoolam et al. | |
| 9,614,763 B2 | 4/2017 | Dong et al. | |
| 9,658,868 B2 | 5/2017 | Hill | |
| 9,658,876 B2 | 5/2017 | Chang et al. | |
| 9,733,868 B2 | 8/2017 | Chandrasekaran et al. | |
| 9,763,518 B2 | 9/2017 | Charest et al. | |
| 9,830,240 B2 | 11/2017 | George et al. | |
| 9,853,873 B2 | 12/2017 | Dasu et al. | |
| 2002/0049980 A1* | 4/2002 | Hoang | H04N 7/165 725/91 |
| 2002/0053009 A1 | 5/2002 | Selkirk et al. | |
| 2002/0073276 A1 | 6/2002 | Howard et al. | |
| 2002/0083120 A1 | 6/2002 | Soltis | |
| 2002/0095547 A1 | 7/2002 | Watanabe et al. | |
| 2002/0103889 A1 | 8/2002 | Markson et al. | |
| 2002/0103943 A1 | 8/2002 | Lo et al. | |
| 2002/0112113 A1 | 8/2002 | Karpoff et al. | |
| 2002/0120741 A1 | 8/2002 | Webb et al. | |
| 2002/0138675 A1 | 9/2002 | Mann | |
| 2002/0156971 A1 | 10/2002 | Jones et al. | |
| 2003/0023885 A1 | 1/2003 | Potter et al. | |
| 2003/0026267 A1 | 2/2003 | Oberman et al. | |
| 2003/0055933 A1* | 3/2003 | Ishizaki | G06Q 10/06 709/223 |
| 2003/0056126 A1 | 3/2003 | O'Connor et al. | |
| 2003/0065986 A1 | 4/2003 | Fraenkel et al. | |
| 2003/0084359 A1 | 5/2003 | Bresniker et al. | |
| 2003/0118053 A1 | 6/2003 | Edsall et al. | |
| 2003/0131105 A1 | 7/2003 | Czeiger et al. | |
| 2003/0131165 A1* | 7/2003 | Asano | G06Q 30/0207 710/74 |
| 2003/0131182 A1 | 7/2003 | Kumar et al. | |
| 2003/0140134 A1 | 7/2003 | Swanson et al. | |
| 2003/0140210 A1 | 7/2003 | Testardi | |
| 2003/0149763 A1 | 8/2003 | Heitman et al. | |
| 2003/0154271 A1 | 8/2003 | Baldwin et al. | |
| 2003/0159058 A1 | 8/2003 | Eguchi et al. | |
| 2003/0174725 A1 | 9/2003 | Shankar | |
| 2003/0189395 A1 | 10/2003 | Doornbos et al. | |
| 2003/0210686 A1 | 11/2003 | Terrell et al. | |
| 2004/0024961 A1 | 2/2004 | Cochran et al. | |
| 2004/0030857 A1 | 2/2004 | Krakirian et al. | |
| 2004/0039939 A1 | 2/2004 | Cox et al. | |
| 2004/0054776 A1 | 3/2004 | Klotz et al. | |
| 2004/0057389 A1 | 3/2004 | Klotz et al. | |
| 2004/0059807 A1 | 3/2004 | Klotz et al. | |
| 2004/0088574 A1 | 5/2004 | Walter et al. | |
| 2004/0117438 A1 | 6/2004 | Considine et al. | |
| 2004/0123029 A1* | 6/2004 | Dalal | G06F 3/0605 711/114 |
| 2004/0128470 A1 | 7/2004 | Hetzler et al. | |
| 2004/0128540 A1 | 7/2004 | Roskind | |
| 2004/0153863 A1 | 8/2004 | Klotz et al. | |
| 2004/0190901 A1 | 9/2004 | Fang | |
| 2004/0215749 A1 | 10/2004 | Tsao | |
| 2004/0230848 A1 | 11/2004 | Mayo et al. | |
| 2004/0250034 A1 | 12/2004 | Yagawa et al. | |
| 2005/0033936 A1* | 2/2005 | Nakano | G06F 3/0605 711/170 |
| 2005/0036499 A1 | 2/2005 | Dutt et al. | |
| 2005/0050211 A1 | 3/2005 | Kaul et al. | |
| 2005/0050270 A1 | 3/2005 | Horn et al. | |
| 2005/0053073 A1 | 3/2005 | Kloth et al. | |
| 2005/0055428 A1 | 3/2005 | Terai et al. | |
| 2005/0060574 A1 | 3/2005 | Klotz et al. | |
| 2005/0060598 A1 | 3/2005 | Klotz et al. | |
| 2005/0071851 A1 | 3/2005 | Opheim | |
| 2005/0076113 A1 | 4/2005 | Klotz et al. | |
| 2005/0091426 A1 | 4/2005 | Horn et al. | |
| 2005/0114611 A1 | 5/2005 | Durham et al. | |
| 2005/0114615 A1 | 5/2005 | Ogasawara et al. | |
| 2005/0117522 A1 | 6/2005 | Basavaiah et al. | |
| 2005/0117562 A1 | 6/2005 | Wrenn | |
| 2005/0138287 A1 | 6/2005 | Ogasawara et al. | |
| 2005/0169188 A1 | 8/2005 | Cometto et al. | |
| 2005/0185597 A1 | 8/2005 | Le et al. | |
| 2005/0188170 A1 | 8/2005 | Yamamoto | |
| 2005/0198523 A1 | 9/2005 | Shanbhag et al. | |
| 2005/0235072 A1 | 10/2005 | Smith et al. | |

(56) References Cited

U.S. PATENT DOCUMENTS

| | | |
|---|---|---|
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1* | 7/2007 | Becker .............. G06F 17/3089 726/16 |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1* | 5/2008 | Murase ............... G06F 3/0613 711/170 |
| 2008/0168304 A1 | 7/2008 | Flynn et al. |
| 2008/0201616 A1 | 8/2008 | Ashmore |
| 2008/0244184 A1* | 10/2008 | Lewis .................. G06Q 30/02 711/130 |
| 2008/0256082 A1* | 10/2008 | Davies ............. G06F 17/30545 |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1* | 2/2010 | Wang ............... G06F 17/30339 711/173 |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1* | 1/2011 | Carew .............. G06F 17/30525 707/793 |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1* | 6/2011 | Van Der Merwe ..... H04L 47/72 370/395.1 |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1* | 11/2011 | Cotner .............. G06F 17/30566 707/769 |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1* | 12/2011 | Hahn ................ G06F 17/30339 707/649 |
| 2011/0313973 A1 | 12/2011 | Srivas et al. |
| 2012/0023319 A1* | 1/2012 | Chin ..................... G06F 9/4418 713/2 |
| 2012/0030401 A1 | 2/2012 | Cowan et al. |
| 2012/0042162 A1* | 2/2012 | Anglin .................. G06F 21/57 713/165 |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1* | 5/2012 | Mane .................... G06Q 30/04 705/34 |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1* | 7/2012 | Hartig .................... G06F 21/52 707/781 |
| 2012/0173589 A1* | 7/2012 | Kwon ............. G06F 17/30575 707/803 |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1* | 11/2012 | Dutta ................. H04L 67/1097 707/737 |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1* | 2/2013 | Mukkara ................ G06F 9/5072 726/1 |
| 2013/0054888 A1* | 2/2013 | Bhat ..................... G06F 3/0604 711/114 |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1* | 4/2013 | Fleming ................. H04L 69/40 711/161 |

(56) References Cited

U.S. PATENT DOCUMENTS

| | | | |
|---|---|---|---|
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1* | 9/2013 | Mandelstein ......... G06F 17/303 707/756 |
| 2013/0266307 A1 | 10/2013 | Garg et al. |
| 2013/0268922 A1 | 10/2013 | Tiwari et al. |
| 2013/0275470 A1* | 10/2013 | Cao ...................... G06F 9/5072 707/781 |
| 2013/0297655 A1* | 11/2013 | Narasayya ........ G06F 17/30575 707/791 |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1* | 1/2014 | Huynh ................. G06F 3/0622 711/114 |
| 2014/0016493 A1 | 1/2014 | Johnsson et al. |
| 2014/0019684 A1 | 1/2014 | Wei et al. |
| 2014/0025770 A1* | 1/2014 | Warfield ........... G06F 15/17331 709/213 |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1* | 2/2014 | Mehta ................... G06F 13/00 711/158 |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1* | 3/2014 | Borshack .......... G06F 17/30097 707/692 |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1* | 4/2014 | David ..................... G06F 17/30 707/827 |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1* | 7/2014 | Brand ................. H04L 67/1097 726/6 |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1* | 8/2014 | Sivasubramanian ....................... G06F 17/30289 707/639 |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1* | 10/2014 | Rajani .................. G06F 3/0644 711/114 |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1* | 7/2015 | Talley ................. G06F 11/2094 707/781 |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1* | 9/2015 | Bhardwaj ......... G06F 17/30082 707/694 |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |

(56) References Cited

U.S. PATENT DOCUMENTS

| | | | |
|---|---|---|---|
| 2017/0019475 | A1 | 1/2017 | Metz et al. |
| 2017/0068630 | A1 | 3/2017 | Iskandar et al. |
| 2017/0131934 | A1* | 5/2017 | Kaczmarczyk ....... G06F 3/0608 |
| 2017/0168970 | A1 | 6/2017 | Sajeepa et al. |
| 2017/0177860 | A1 | 6/2017 | Suarez et al. |
| 2017/0212858 | A1 | 7/2017 | Chu et al. |
| 2017/0273019 | A1 | 9/2017 | Park et al. |
| 2017/0277655 | A1 | 9/2017 | Das et al. |
| 2017/0337097 | A1 | 11/2017 | Sipos et al. |
| 2017/0340113 | A1 | 11/2017 | Charest et al. |
| 2017/0371558 | A1 | 12/2017 | George et al. |
| 2018/0097707 | A1 | 4/2018 | Wright et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Färber, et al., "An In-Memory Database System for Multi-Tenant Applications," Proceedings of 14th Business, Technology and Web (BTW) Conference on "Database Systems for Business, Technology, and Web," Feb. 28 to Mar. 4, 2011, University of Kaiserslautern, Germany, 17 pages; http://cs.emis.de/LNI/Proceedings/Proceedings180/650.pdf.

Sage A. Weil, "Ceph: Reliable, Scalable, and High-Performance Distributed Storage," University of California, Santa Cruz, Dec. 2007, 239 pages, on the Cisco Catalyst 4500 Classic Supervisor Engines, http://ceph.com/papers/weil-thesis.pdf.

Guo, et al., "IBM Resarch Report: Data Integration and Composite Business Services, Part 3, Building a Multi-Tenant Data Tier with with [sic] Access Control and Security," RC24426 (C0711-037) Nov. 19, 2007, Computer Science, 20 pages.

Shue, et al., "Performance Isolation and Fairness for Multi-Tenant Cloud Storage," USENIX Association, 10$^{th}$ USENIX Symposium on Operating Systems Design Implementation (OSDI '12), 14 pages; https://www.usenix.org/system/files/conference/osdi12/osdi12-final-215.pdf.

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10/5-benefits-of a storage-gateway-in-the-cloud.

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, San Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-without-altering-the-actual-crc-checksum.

Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013], 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. And VMware, Inc., Sep. 2008, 10 pages.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer," Enabling Confidence in Application Performance Before Deployment, 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks an Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia.org/wiki/Standard_RAID_levels.

Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "VBLOCK Solution for SAP: Simplified Provisioning for Operation Efficiency," VCE White Paper, VCE—The Virtual Computing Environment Company, Aug. 2011, 11 pages.

Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

(56) References Cited

OTHER PUBLICATIONS

Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Hatzieleftheriou, Andromachi, et al., "Host-side Filesystem Journaling for Durable Shared Storage," 13th USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, $EMC^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, Ao, et al., "RAIDShield: Characterizing, Monitoring, and Proactively Protecting Against Disk Failures," FAST '15, 13th USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.

Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: 5th USENIX Conference on File and Storage Technologies, Feb. 13-16, 2007, 16 pages, San Jose, California, U.S.A.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.

(56) References Cited

OTHER PUBLICATIONS

Zhu, Yunfeng, et al., "A Cost-based Heterogeneous Recovery Scheme for Distributed Storage Systems with RAID-6 Codes," University of Science & Technology of China, 2012, 12 pages.
Stamey, John, et al., "Client-Side Dynamic Metadata in Web 2.0," SIGDOC '07, Oct. 22-24, 2007, pp. 155-161.
Aweya, James, et al., "Multi-level active queue management with dynamic thresholds," Elsevier, Computer Communications 25 (2002) pp. 756-771.
Petersen, Chris, "Introducing Lightning: A flexible NVMe JBOF," Mar. 9, 2016, 6 pages.

* cited by examiner

TENANT-LEVEL SHARDING OF DISKS WITH TENANT-SPECIFIC STORAGE MODULES TO ENABLE POLICIES PER TENANT IN A DISTRIBUTED STORAGE SYSTEM

TECHNICAL FIELD

This disclosure relates in general to the field of data storage and, in particular, to tenant-level sharding of disks with tenant-specific storage modules to enable policies per tenant in a distributed storage system.

BACKGROUND

In recent years, cloud-based storage has emerged to offer a solution for storing, accessing, and protecting electronic data owned or controlled by all types of private and public entities. Distributed storage systems may offer a storage platform designed to provide object based, block based, and file based storage from a single distributed storage cluster in a cloud. A distributed storage cluster may contain numerous nodes for storing objects and other data. Generally, a single storage cluster of a distributed storage system, such as Ceph, is designed to accommodate data from multiple tenants, where the same set of rules and weights apply to all of the tenants. Typically, data belonging to the multiple tenants share the same storage device daemons or other software and disk partitions. Tenants, however, sometimes prefer to receive particular types and levels of service.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
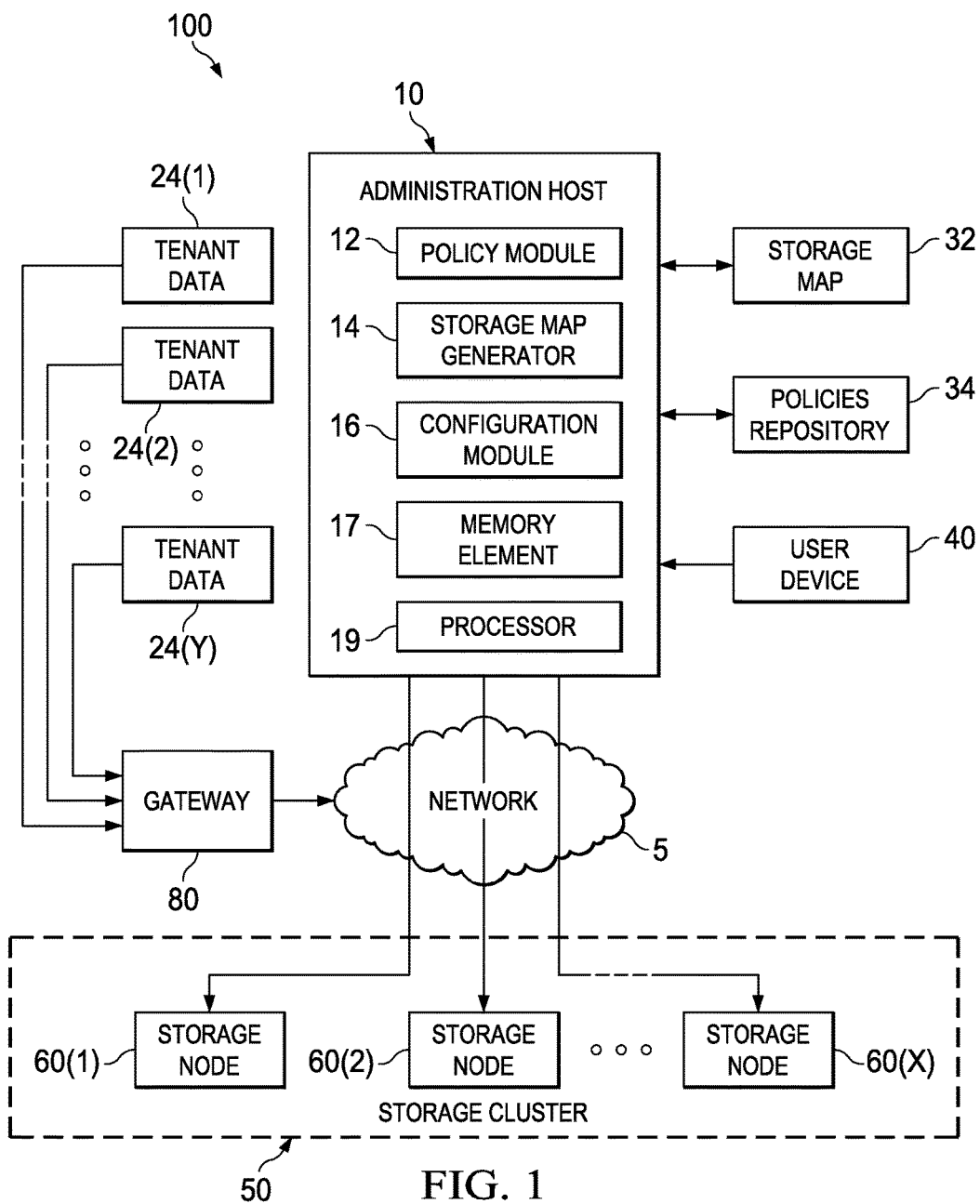
FIG. 1 is a simplified block diagram of a distributed storage system according to at least one embodiment of the present disclosure.

The present disclosure describes a recovery system for a distributed storage system. A method is provided in one example of the present disclosure and includes receiving an indication of a data storage module to be associated with a tenant of a distributed storage system, allocating a partition of a disk for data of the tenant, creating a first association between the data storage module and the disk partition, creating a second association between the data storage module and the tenant, and creating rules for the data storage module based on one or more policies configured for the tenant.

In specific embodiments, the method further includes receiving an indication of a type of subscription model selected for the tenant, and selecting the disk partition to be allocated based, at least in part, on the subscription model selected for the tenant. In further specific embodiments, the data storage module can store at least some data of the tenant in the disk partition based, at least in part, on the rules. In some embodiments, the one or more policies are related to at least one of a performance requirement of disks to store the data, a distribution requirement for the data, and a replication requirement for the data.

In at least some embodiments, the method includes generating a storage map indicating the first association between the data storage module and the disk partition and indicating the second association between the data storage module and the tenant. The method may also include generating a unique identifier of the data storage module, wherein the unique identifier of the data storage module is mapped to the tenant in the storage map, and wherein the unique identifier is not mapped to any other tenants in the storage map. In specific implementations, the storage map includes a mapping of the unique identifier of the data storage module to the tenant and a mapping of the unique identifier of the data storage module to the disk partition.

In at least some embodiments, one or more other partitions of the disk are associated with one or more other data storage modules, respectively, and the one or more other data storage modules are associated with one or more other tenants, respectively, of the distributed storage system. The disk partition can include a portion of the disk or all of the disk, and only data of the tenant is to be stored in the disk partition.

In at least some embodiments, the method can further include receiving an indication of a second data storage module to be associated with the tenant of the distributed storage system, allocating a second disk partition for other data of the tenant, creating a third association between the second data storage module and the second disk partition, creating a fourth association between the second data storage module and the tenant, and creating other rules for the second data storage module based on one or more other policies configured for storing other data of the tenant. The data may include one of objects, files or blocks. In at least one embodiment, the distributed storage system is a Ceph storage system.

Some or all of the elements, operations, and features may be included in respective systems, apparatuses, and devices for performing the described functionality. Furthermore, some or all of the features may be implemented in at least one machine readable storage medium.

DESCRIPTION OF EMBODIMENTS

FIG. 1 is a simplified block diagram of an example distributed storage system 100 with an administration host 10 configured to enable tenant-level sharding of disks with one or more unique data storage modules per tenant. Administration host 10 may communicate with storage nodes 60(1)-60(X) of storage cluster 50 over one or more networks such as network 5. In at least one example, administration host 10 can include a policy module 12, a storage map generator 14, and a configuration module 16 to facilitate tenant-level configuration of distributed storage system 100. Administration host 10 also includes at least one processor 19, at least one memory element 17, and other suitable hardware (not shown) to facilitate the operations thereof. A policies repository 34 may be associated with administration host 10, to store tenant-level policies including subscription models associated with tenants. Administration host 10 may include a user interface to enable communication with a user via a user device 40. When storage cluster 50 is configured to enable tenants to store data in the cluster, administration host 10 can generate a storage map 32 including rules and settings based, at least in part, on tenant policies. Storage map 32 can indicate how data is to be stored in and retrieved from storage nodes in storage cluster 50 and can include tenant-specific rules related to storing and retrieving the data. A gateway 80 may receive tenant data 24(1)-24(Y) for distribution and storage across storage nodes 60(1)-60(X) based on storage map 32. In this example, each instance of tenant data, indicated at 24(1)-24(Y), is associated with a single tenant. Some instances of the tenant data 24(1)-24(Y) may be associated with the same tenant, but stored in a different disk partition in storage cluster 50.

Elements of FIG. 1 may be coupled to one another through one or more interfaces employing any suitable connections (wired or wireless), which provide viable pathways for network communications in a network environment. Additionally, one or more of these elements of FIG. 1 may be combined, divided, or removed from the architecture based on particular configuration needs. Distributed storage system 100 may include a configuration capable of transmission control protocol/internet protocol (TCP/IP) communications for the transmission and/or reception of packets in a network. Distributed storage system 100 may also operate in conjunction with a user datagram protocol/IP (UDP/IP), any other suitable protocol, or any suitable combination thereof where appropriate and based on particular needs.

For purposes of illustrating the techniques of administration host 10, it is important to understand the activities that may be present in a distributed storage system. The following foundational information may be viewed as a basis from which the present disclosure may be properly explained. Such information is offered for purposes of explanation only and, accordingly, should not be construed in any way to limit the broad scope of the present disclosure and its potential applications.

Distributed storage systems have emerged to provide a scalable option for cloud storage with greater accessibility and protection of stored data. Object storage involves storing chunks of data in an object, with each object including metadata and a unique identifier. Distributed storage systems can also be applied to other types of data storage such as block storage and file storage, for example. In block storage, data can be stored in blocks (or volumes) where each block acts as an individual hard drive. File storage is generally a hierarchical way of organizing files containing data such that an individual file can be located by a path to that file. Certain metadata describing the file and its contents is also typically stored in the file system. In distributed storage systems, multiple replicas of data in any suitable type of structure (e.g., objects, files, blocks, etc.) can be maintained in order to provide fault tolerance and high availability. Although embodiments may be described herein with reference to objects and distributed object storage, this is done for ease of illustration and it should be understood that these embodiments may also be applicable to other types of data storage structures (e.g., file, block, etc.) and distributed storage including, but not limited to distributed file storage and distributed block storage.

An example distributed storage system that provides high fault tolerance and availability includes Ceph, which is described by Sage A. Weil in the dissertation, "Ceph: Reliable, Scalable, and High-Performance Distributed Storage," University of California, Santa Cruz, December 2007. Ceph is open source software designed to provide object, block and file storage from a distributed storage cluster. The storage cluster can be comprised of storage nodes with one or more memory elements (e.g., disks) for storing data. Storage nodes are also referred to as object storage devices (OSDs), which can be physical or logical storage elements. In Ceph, storage nodes generally include an object storage device (OSD) software or daemon, which actually stores data as objects on the storage nodes. Ceph OSD software typically stores data on a local filesystem including, but not limited to, a B-tree file system (Btrfs). At least one Ceph metadata server can be provided for a storage cluster to store metadata associated with the objects (e.g., inodes, directories, etc.). Ceph monitors are provided for monitoring active and failed storage nodes in the cluster. It should be understood that embodiments described herein could be implemented in Ceph, or potentially in other distributed storage systems.

A distributed storage system such as Ceph, can provide storage in a storage cluster for data from multiple tenants. Generally, in Ceph, objects from the tenants are pseudo-randomly distributed across the cluster and are monitored by the same set of storage processes (e.g., OSD daemons). Thus, the same global configurations and distribution settings for dividing objects between different nodes may be used to store the objects of the tenants.

In Ceph, how and where to store data in a cluster is determined by a Controlled Replication Under Scalable Hashing (CRUSH) algorithm that computes data storage locations based on a CRUSH map. The CRUSH map identifies information about the storage cluster including the layout and capacity of storage nodes and how redundancy should be managed. More specifically, the map can contain a list of rules that tells CRUSH how it should replicate data in a Ceph cluster's pool. The rules can contain a replication factor for a particular pool of data to help determine how many times the data is to be replicated within the cluster and on which storage nodes the replicated data is to be stored. A pool can comprise a collection of data, such as objects, and a replication factor can be assigned to each pool. Typically, a pool can be shared across tenants.

In a typical Ceph configuration, when multiple tenants use a shared storage cluster, the same set of bucket weights and CRUSH rules apply to all tenants, and objects belonging to different tenants share the same object storage device daemons and disk partitions. In some scenarios, however, a tenant may have different requirements or preferences for its data than other tenants sharing the same storage cluster in a distributed storage system. Such requirements may be related to performance, distribution, and/or replication in at least some scenarios. For example, a tenant may desire certain input/output operations to be satisfied that require storage on a particular type of disk. Another tenant may not need maximum priority for its data. In another example, a tenant may prefer particular storage nodes or disk partitions for its data. In addition, a multi-tenant resource isolation problem may exist when a disk partition contains data from multiple tenants. If the partition fails in this scenario, then all of the tenants sharing the partition could be affected by the failure and subsequent recovery process.

In accordance with at least one embodiment of the present disclosure, the aforementioned issues (and more) associated with existing distributed storage systems can be resolved. Embodiments of distributed storage system 100 enable tenant-specific sharding of storage disks in each storage node 60(1)-60(X) of storage cluster 50. Administration host 10 is configured to enable tenant-specific data storage modules to control data replication processes and primary node selection to provide unique, per tenant behaviors. In particular, one or more tenant-specific disk partitions may be allocated for each tenant sharing the storage cluster. The tenant-specific disk partitions can be controlled by individual per tenant data storage modules. This enables independent configurations per tenant for data storage in the storage cluster. A storage map can be generated with the configurations. In at least one embodiment, independent configurations for a tenant could include rules based, at least in part, on the tenant's subscription model to the distributed storage service. Other independent configurations for a tenant could include rules based on policies configured for differentiated services (e.g., performance, distribution, replication) for the tenant. In at least some embodiments, different sets of independent configurations for the same tenant may be created for different data storage modules controlling the multiple disk partitions. Accordingly, the tenant may be allowed to apply different sets of configurations to different sets of data.

Several advantages can be achieved by offering a distributed storage system that enables unique, per-tenant configurations for tenant data stored in a shared storage cluster. First, differentiated service levels can be provided to tenants based on a subscription model associated with each tenant. The differential behavior enabled for each tenant can provide the benefits of performance isolation between tenants and failure isolation between disk partitions. By enabling tenant-specific partitions per disk with a dedicated data storage module per tenant, a partition failure that occurs for a particular tenant can trigger a recovery process that impacts only that tenant during rebalancing and recreating replicas of data that is lost due to the failure. Also, by enabling differentiated settings for each data storage module per tenant, the performance impacts of each tenant can be isolated. Such performance impacts can occur during cluster rebalancing, failure recovery, and reading/writing data that relies on a replica storage node selection. Also, individual data storage modules per tenant prevent contention of a single data storage module between tenants sharing the data storage module.

It should be noted that, as used herein, 'tenant' is intended to refer to an entity (or an identifier or other representation of the entity) that is associated with certain data stored (or allowed to be stored) in a distributed storage system. The association between an entity and the stored data may be in the form of ownership, management, control, etc. of that data, which can include objects, files, blocks, etc. Generally, each object, block or file stored in a distributed storage system is associated with a single tenant. Multiple tenants may have data stored in the distributed storage system.

Turning to the infrastructure of FIG. 1, FIG. 1 is a simplified block diagram of distributed storage system 100, including administration host 10, storage cluster 50, and gateway 80 communicating via network 5. Network 5 represents a series of points or nodes of interconnected communication paths for receiving and transmitting packets of information that propagate through the network environment. Network 5 offers a communicative interface between nodes (e.g., storage nodes 60(1)-60(X)), administration host 10, and gateway 80, and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in a network environment. In at least some embodiments, one or more other elements in the network environment may also communicate via networks such as, for example, those networks described with reference to network 5. For ease of illustration, however, not all elements of FIG. 1 are depicted with communication lines traversing network 5 (e.g., policies repository 34, user device 40, etc.).

In network 5, network traffic, which is inclusive of packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., administration host 10, gateway 80) and a destination node (e.g., storage nodes 60(1)-60(X)) via network 5. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Administration host 10 and gateway 80 can be implemented as one or more network elements in a network environment. As used herein, the term 'network element' is meant to encompass servers, processors, modules, routers, switches, gateways, bridges, load balancers, firewalls, inline service nodes, proxies, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

Storage nodes 60(1)-60(X) are network elements that include physical or logical storage elements with one or more disks for storing electronic data. In embodiments disclosed herein, tenant data is stored in storage nodes 60(1)-60(X). When the data is stored as objects, each object may have a unique identifier and associated metadata. Data storage modules may be provided in each storage node to determine storage locations for the data, to store the data, and to provide access to the data over the network. Data in storage nodes 60(1)-60(X) can be accessed by clients (not shown) via gateway 80 by an application programming interface (API) or hypertext transfer protocol (HTTP), for example. Clients can enable users, including human users and/or applications, to access the stored data.

In one implementation, network elements of FIG. 1, such as administration host 10, storage nodes 60(1)-60(X), and gateway 80, include software to achieve (or to foster) tenant-level configuration operations for distributed storage system 100, as outlined herein. Note that in one example, the network elements of FIG. 1 can have internal structures (e.g., processor 19, memory element 17, network interface card, etc.) to facilitate some of the operations described herein. In other embodiments, these tenant-level configuration activities may be executed externally to these network elements, or included in some other network element to achieve this intended functionality. Alternatively, the network elements of FIG. 1 may include this software (or reciprocating software) that can coordinate with other network elements in order to achieve the operations, as outlined herein. In still other embodiments, one or several devices may include any suitable algorithms, hardware, software, firmware, components, modules, interfaces, or objects that facilitate the operations thereof.

As shown in FIG. 1, policy module 12 may be provided in administration host 10. Policy module 12 may provide or interact with a user interface to enable a user to configure, delete, update/modify, and access policies for each tenant. A user may access administration host 10 via a user device, such as user device 40. Policies that can be configured for a tenant can include a subscription model (e.g., specifying partition size for tenant, priority of tenant relative to other tenants, etc.). By way of illustration, a 'Gold' subscription model could allow a partition size of 1 terabyte (TB), and a 'Silver' subscription model could allow a partition size of 100 gigabytes (GB).

Other tenant-level policies can be configured to enable differentiated services for the tenant. For example, such policies can include, but are not limited to, performance requirements, distribution requirements, and replication requirements. Performance requirements can be based on some performance characteristic of a disk such as speed of the disk, input/output rate of the disk, etc. Distribution requirements can be based on where data is to be stored such as a particular disk, a particular rack, a particular location, etc. Distribution requirements can also include how far apart or how close together replicas can be relative to each other. Replication requirements can be based on the number of replicas desired for the data of a tenant. By way of illustration, one tenant may have strict input/output performance requirements and thus, may choose a policy to ensure that most of its data and the primary replica nodes are in solid state device (SSD) disks. A different tenant may choose a different policy if that tenant does not have the same need for SSD-like throughputs.

In at least one embodiment, policies may be stored in policies repository 34. Policies repository 34 may be provided in any suitable type of storage, which may be internal to administration host 10 or external (entirely or in part). Internal storage could include any internal memory of administration host 10, such as static storage, random access memory (RAM), or cache, for example. External storage could include a network storage technique such as network attached storage (NAS) or storage area network (SAN), or memory of another network element.

Configuration module 16 may be provided in administration host 10 to enable per tenant configurations. In at least one embodiment, configuration module 16 and a user interface can enable a user to configure storage cluster 50 with individual per tenant data storage modules for tenant-specific disk partitions in storage nodes 60(1)-60(X). When a new data storage module is added for a tenant, a unique identifier may be generated for the data storage module and associated with the tenant. Per tenant configuration of a storage node is described in more detail with reference to FIG. 2.

Figure 2:
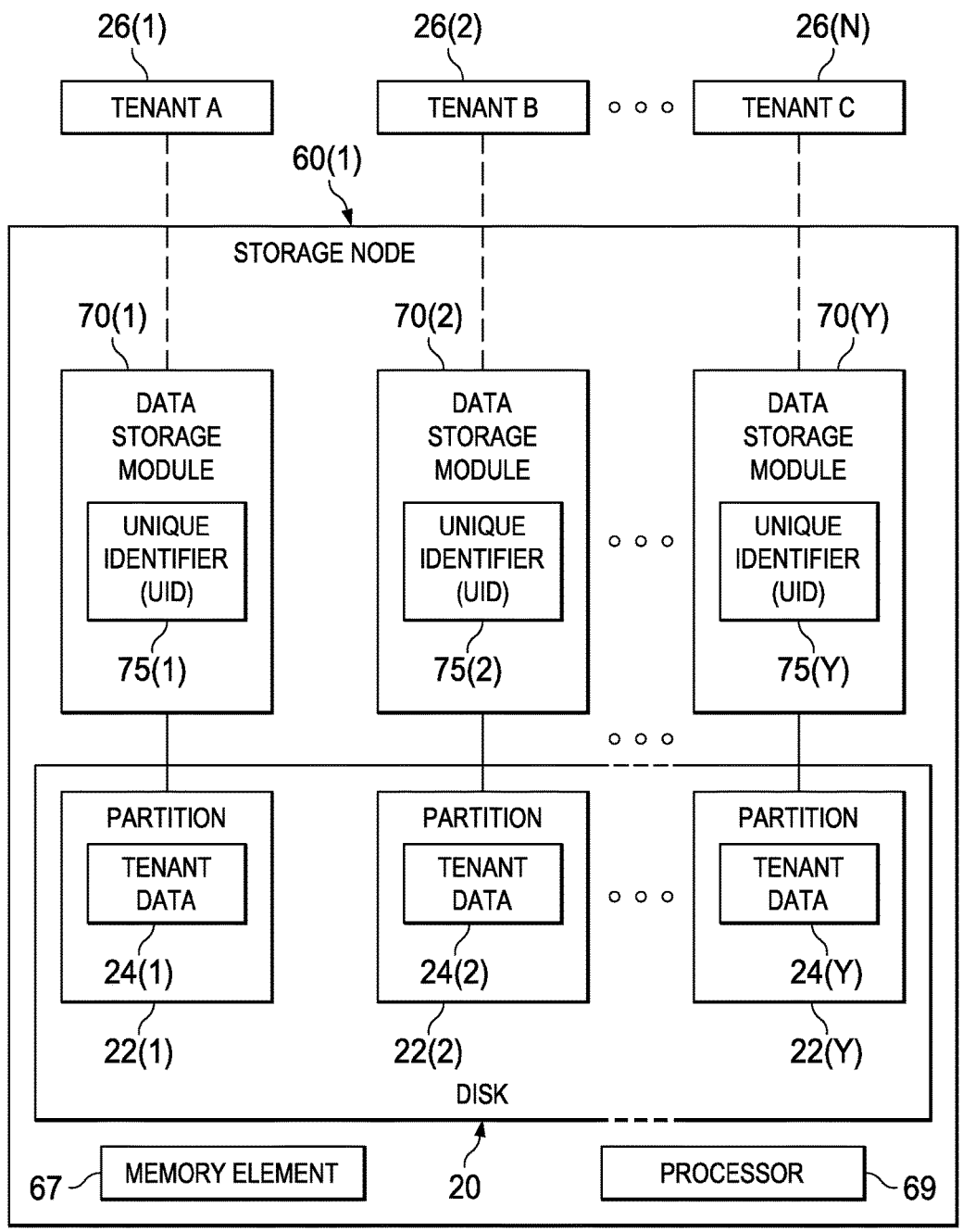
FIG. 2 is a simplified block diagram showing additional possible details of a storage node in the distributed storage system according to at least one embodiment.

Turning to FIG. 2, FIG. 2 is a simplified block diagram of an example configuration of storage node 60(1). Storage node 60(1) is depicted with a single disk 20 containing partitions 22(1)-22(Y). In this example, tenant data 24(1)-24(Y) is stored in respective partitions 22(1)-22(Y). Data storage modules 70(1)-70(Y) have respective unique identifiers 75(1)-75(Y), and are associated with respective partitions 22(1)-22(Y). Each data storage module 70(1)-70(Y) and its respective partition 22(1)-22(Y) are associated with a single tenant 26(1)-26(N). Storage node 60(1) also includes at least one processor 69 and at least one memory element 67, and other suitable hardware (not shown) to facilitate the operations thereof. For ease of illustration and explanation, storage node 60(1) is shown with single disk 20 in this example configuration. It should be appreciated, however, that storage nodes may contain more than one disk, and any one or more disks in a storage node may be partitioned one or more times to achieve tenant-level sharding according to embodiments described herein.

Embodiments disclosed herein allow for multiple data storage modules per disk, as shown by data storage modules 70(1)-70(Y) of disk 20. At least one dedicated data storage module may be provided per tenant. For example, each data storage module of data storage modules 70(1)-70(Y) is associated with a single tenant. In some instances, more than one of the data storage modules 70(1)-70(Y) may be associated with the same tenant and assigned to different disk partitions within the same disk or across multiple disks. In at least one embodiment, however, none of these data storage modules is to be associated with multiple tenants.

For illustration purposes, assume N=3 such that three tenants store data in storage node 60(1), and Y=5 such that five data storage modules are configured in storage node 60(1). In this scenario, one possible result includes data storage modules 75(1) and 75(3) associated with tenant A 26(1), data storage modules 75(2) and 75(4) associated with tenant B 26(2), and data storage module 70(5) associated with tenant C 26(3). In addition, each data storage module 70(1)-70(5) could be assigned to a respective dedicated disk partition 22(1)-22(5).

Embodiments disclosed herein also enable tenant-level sharding. In the example shown in FIG. 2, data storage module 70(1) is associated with tenant A 26(1) and assigned to partition 22(1), data storage module 70(2) is associated with tenant B 26(2) and assigned to partition 22(2), and data storage module 70(Y) is associated with tenant C 26(N) and assigned to partition 22(Y). Thus, tenant data 24(1) belongs to tenant A 26(1) and is stored in partition 22(1), tenant data 24(2) belongs to tenant B 26(2) and is stored in partition 22(2), and tenant data 24(Y) belongs to tenant C 26(N) and is stored in partition 22(Y). In at least one embodiment, data storage modules 70(1)-70(Y) may be configured as daemons that run as background processes to determine where to store data and to interact with logical disks to store and access data.

Embodiments also allow a single disk to be shared by a fewer number of tenants. This may occur, for example, if one or more tenants require a significant amount of storage. In certain cases, an entire disk (e.g., 1 TB) may be allocated for use by a single tenant. Having a disk shared by a fewer number of tenants can minimize the risk of interruption by other tenants.

In at least one embodiment, tenant-level disk partitions may be selected manually or automatically. Configuration module 16 may be provided in administration host 10 to enable the selection. For a manual selection, a user may add a data storage module for a particular tenant and then manually select a particular disk partition to be allocated for the data storage module. Alternatively, the disk partition may be pre-determined based on policies. In this case, after adding a data storage module for a particular tenant, a disk partition may be automatically selected and allocated for the data storage module. In this scenario, the disk partition may be selected based on policies, such as the tenant's subscription model and/or tenant-specific policies to enable differentiated services for the tenant.

For illustration purposes, assume a subscription model specifies 1 TB of storage for tenant A, and a tenant-specific policy requires SSD disks for tenant A's data. In this example scenario, 1 TB of available space on a SSD disk in a storage node of the cluster may be automatically identified and allocated for the data storage module associated with tenant A. In another illustration with reference to FIG. 2, if tenant A 26(1) has a 'Gold' subscription model, then partition 22(1) may have a size of 1 TB. If tenants B 26(2) and C 26(N) have a 'Silver' subscription model, then partitions 22(2) and 22(Y) may each have a size of 100 GB. The number of data storage modules in a single disk can be dependent, at least in part, on the size of the disk and the partition size required by each tenant for its data.

In at least one embodiment, an association is created between a data storage module and a disk partition that is selected and allocated for the data storage module. An association is also created between the data storage module and the tenant for which the data storage module was created. In addition, one or more rules for the tenant may be created based on policies configured for the tenant (e.g., subscription model, performance requirements, distribution requirements, replication factor, etc.). The rules may be associated with the tenant and the data storage module associated with that tenant. These associations may be realized in any suitable manner including, but not limited to, mapping a unique identifier of the data storage module to suitable identifiers or other representations of the disk partition, the tenant, and/or the rules.

In at least one embodiment, these mappings can be provided in storage map 32. Storage map generator 14 may be provided in administration host 10 to generate storage map 32. Storage map 32 can be used by data storage modules, including data storage modules 70(1)-70(Y), to determine how to store and retrieve data in a storage cluster such as storage cluster 50. In at least one embodiment, storage map 32 is a map of storage cluster 50, including at least a list of tenant-specific data storage modules (e.g., using their unique identifiers) mapped to associated tenants, allocated disk partitions, and sets of rules generated for the associated tenants. Because each data storage module is dedicated to a single tenant, the tenant can decide what policies to configure so that the rules that are generated enable a desired data distribution in the storage cluster.

At least one embodiment allows for a user to configure multiple sets of policies for a single tenant. Thus, multiple sets of rules can be generated for different data storage modules of the same tenant. For example, assume first and second data storage modules are associated with tenant A, and first and second rule sets are also associated with tenant A. In one possible scenario, the first rule set could be associated with the first data storage module and the second rule set could be associated with the second data storage module. Accordingly, the different data storage modules can be used for different types of data of tenant A. For example, the first and second data storage modules could be assigned to different types of disks. The first rule set could include a rule requiring an SSD disk partition, and the second rule set may not specify a particular type of disk and may rely on default settings or criteria. In this example scenario, critical data could be stored using the first data storage module (i.e., on an SSD disk) and less critical data could be stored using the second data storage module.

In one example implementation using a distributed storage system such as Ceph, an embodiment as described herein can allow for pools, which are logical groups for storing data in a storage cluster, to have a one-to-one correspondence to tenants. Users associated with a particular tenant may be authorized to access only pools corresponding to that particular tenant. The tenant's data to be added to the storage cluster is to be stored in the pool corresponding to the tenant. Rules that are created from the policies can be written for the pool belonging to the tenant, which uses one or more data storage modules that are only mapped to that tenant. The rules can be provided in the storage map and can be used by the data storage modules to determine a primary storage location for the data and its replicas in the storage cluster.

Figure 3:
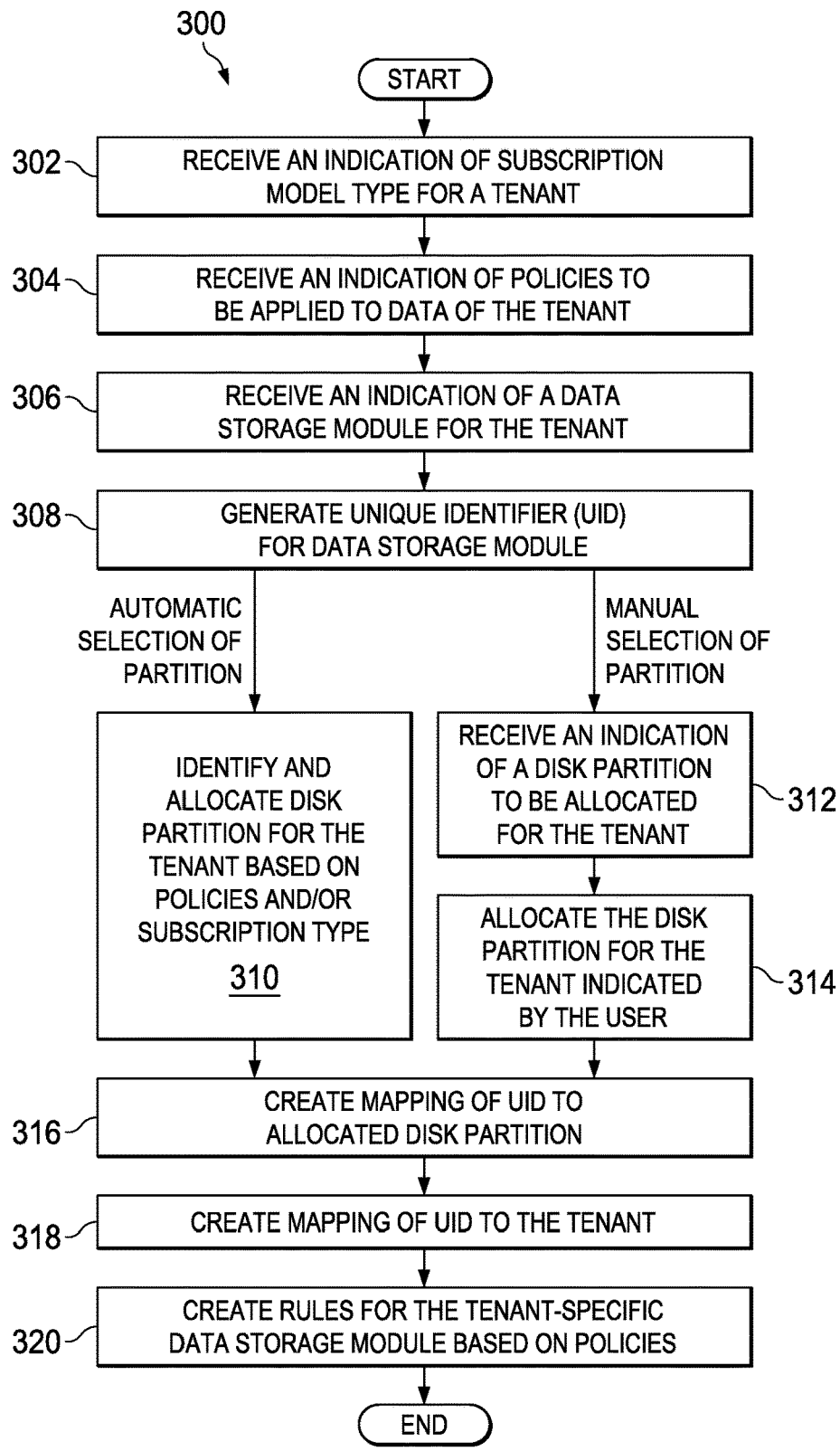
FIG. 3 is a simplified flowchart illustrating possible activities associated with the distributed storage system according to at least one embodiment.

Turning to FIG. 3, FIG. 3 is a simplified flowchart 300 illustrating potential operations that may be associated with embodiments described herein. In at least one embodiment, one or more sets of operations correspond to activities of FIG. 3. In at least one embodiment, administration host 10 may comprise means such as one or more processors (e.g., processor 19), for performing the operations. In one example, at least some operations shown in flowchart 300 may be performed by at least one of policy module 12, storage map module 14, and configuration module 16 when executed by one or more processors such as processor 19. For ease of reference, operations of flowchart 300 may be described without specific reference to particular modules of administration host 10.

At 302, administration host 10 receives an indication of a type of subscription model for a tenant. The type of the subscription model may be selected for the tenant by a user via a user interface. The subscription model may specify a partition size (e.g., 100 GB, 500 GB, 1 TB, etc.) desired by the tenant for storing its data. The subscription model may also specify a priority relative to other subscription types. Priority could be used, for example, to resolve contention between data storage modules accessing the same disk.

At 304, administration host 10 receives an indication of policies to be applied to data of the tenant. The policies may be configured by the user via a user interface. Policies may include, for example, performance requirements, distribution requirements, replication factor, etc. preferred by the tenant. In some embodiments, any of the performance, distribution and/or replication requirements may be included in a subscription model rather than being configured separately. At 306, administration host 10 receives an indication of a data storage module to be assigned to the tenant. The data storage module may be assigned to the tenant by the user via a user interface, and may be dedicated to that tenant. At 308, a unique identifier (UID) may be generated for the data storage module assigned to the tenant.

A disk partition for the data storage module may be selected manually or automatically. For manual selection at 312, administration host 10 can receive an indication of a particular disk partition (or an entire disk) to be allocated for the tenant. The particular disk partition may be selected by the user via the user interface. At 314, the selected disk partition may be allocated for the tenant. For automatic selection of a disk partition (or entire disk), at 310, administration host 10 can identify and allocate a disk partition (or an entire disk) from available storage nodes in a storage cluster based on policies configured for the tenant and/or the subscription model assigned to the tenant.

At 316, an association is created between the data storage module and the allocated disk partition. In at least one embodiment, this association may be realized by mapping the UID of the data storage module to the disk partition. In an example, a suitable identifier or other representation of the disk partition (or disk) may be used for the mapping. At 318, an association is created between the data storage module and the tenant. In at least one embodiment, this association may be realized by mapping the UID of the data storage module to the tenant. In an example, a suitable identifier or other representation of the tenant may be used for the mapping. At 320, one or more rules can be created based on policies configured for the tenant (e.g., replication factor, subscription model, performance requirements, distribution requirements, etc.). The rules may be associated with the data storage module that is associated with the tenant. This association may be realized by mapping the UID of the data storage module to the rules. In an example, a suitable identifier or other representation of the rules may be used for the mapping. In at least one embodiment, these mappings can be provided in a storage map used by data storage module to determine how to store and retrieve data in the storage cluster. In addition, the rules created from the policies may also be provided in the storage map in at least one embodiment.

Figure 4:
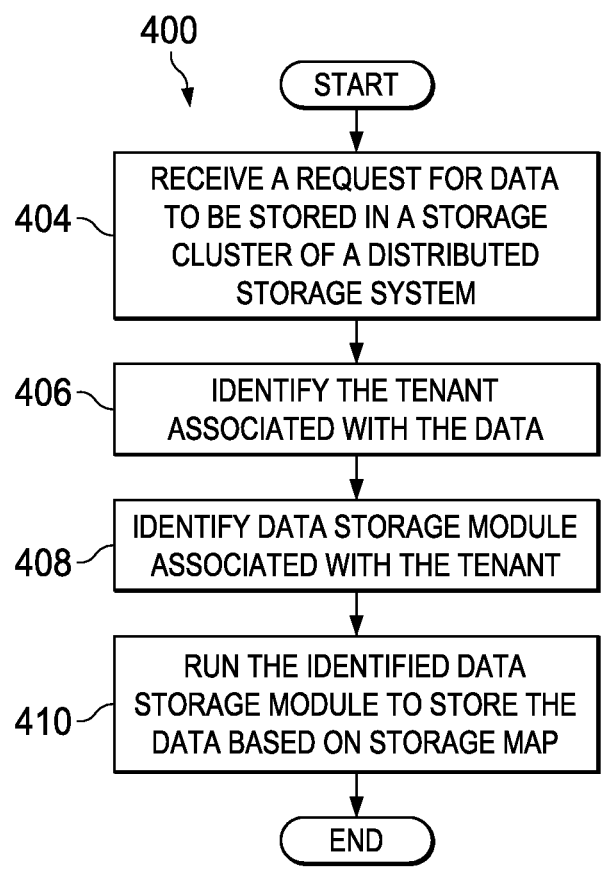
FIG. 4 is a simplified flowchart illustrating other possible activities associated with the distributed storage system according to at least one embodiment.

Turning to FIG. 4, FIG. 4 is a simplified flowchart illustrating potential operations that may be associated with embodiments described herein. In at least one embodiment, one or more sets of operations correspond to activities of FIG. 4. In at least one embodiment, gateway 80 and a storage node (e.g., storage nodes 60(1)-60(X)) may comprise means such as one or more processors (e.g., processor 69), for performing the operations.

Initially, an authorized user of a particular tenant may access gateway 80 in order to add data to the storage cluster. In at least one implementation (e.g., in Ceph), data is added to a pool corresponding to the tenant. At 404, gateway 80 may receive a request for data of the tenant to be stored in storage cluster 50 of distributed storage system 100. In at least one embodiment, the request may be an indication that the authorized user (e.g., human user or application) has stored objects or other data in a pool corresponding to the tenant. At 406, the tenant associated with the data can be identified based on the pool in which the data is stored. At 408, a data storage module associated with the tenant is identified. This identification may be made based on a mapping of a unique identifier of the data storage module to the tenant.

At 410, the identified data storage module (or modules) associated with the tenant can be run to determine how and where to store the data based on a storage map. Rules associated with the data storage module can be determined from the storage map and used to calculate how and where to store the data (e.g., which disk partition to use, how many replicas to store, where to store the replicas, etc.). Thus, tenant-specific data storage modules can control the primary node selection and the data replication process, which enables unique tenant behaviors configured by policies. Moreover, the dedicated, tenant-specific disk partitions enable failure and performance isolation relative to other tenants and their dedicated disk partitions.

Variations and Implementations

Note that, as used herein, unless expressly stated to the contrary, use of the phrase 'at least one of' refers to any combination of the named items, elements, conditions, activities, etc. For example, 'at least one of X, Y, and Z' is intended to mean any of the following: 1) one or more X's, but not Y and not Z; 2) one or more Y's, but not X and not Z; 3) one or more Z's, but not X and not Y; 4) one or more X's and one or more Y's, but not Z; 5) one or more X's and one or more Z's, but not Y; 6) one or more Y's and one or more Z's, but not X; or 7) one or more X's, one or more Y's, and one or more Z's.

In certain example implementations the tenant-level configuration functions for a distributed storage system outlined herein may be implemented by logic encoded in one or more machine readable storage media (e.g., embedded logic provided in an application specific integrated circuit (ASIC), digital signal processor (DSP) instructions, software (potentially inclusive of object code and source code) to be executed by a processor or other similar machine, etc.). In some of these instances, a memory element (e.g., memory elements 17, 67, a memory element of gateway 80) can store data used for the operations described herein. This includes the memory element being able to store software, logic, code, or processor instructions that are executed to carry out the activities described in this Specification. A processor can execute any type of instructions associated with the data to achieve the operations detailed herein. In one example, the processor (e.g., processors 19, 69, a processor of gateway 80) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, administration host 10 may include software in order to achieve at least some of the tenant-level configuration functions outlined herein. These activities can be facilitated by policy module 12, storage map generator 14, and configuration module 16 (where the functionality of these modules can be suitably combined or divided in any appropriate manner, which may be based on particular configuration and/or provisioning needs). Administration host 10 can include memory elements (e.g., memory element 17) for storing information to be used in achieving at least some of the tenant-level configuration activities, as discussed herein. Additionally, administration host 10 may include one or more processors (e.g., processor 19) that can execute software or an algorithm to perform the tenant-level configuration operations, as disclosed in this Specification. These devices may further keep information in any suitable memory elements (e.g., random access memory (RAM), ROM, EPROM, EEPROM, ASIC, etc.), software, hardware, or in any other suitable component, device, element, or object where appropriate and based on particular needs. Any of the memory items discussed herein (e.g., object, block, file, database, tables, trees, cache, repository, etc.) should be construed as being encompassed within the broad term 'memory element.' Similarly, any of the potential processing elements, modules, and machines described in this Specification should be construed as being encompassed within the broad term 'processor.' Administration host 10 can also include suitable interfaces (e.g., network interface card) for receiving, transmitting, and/or otherwise communicating data or information in distributed storage system 100.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of operations by only referencing a limited number of network elements and nodes. It should be appreciated that distributed storage system 100 (and its teachings) is readily scalable and can accommodate a large number of components, as well as more complicated/sophisticated arrangements and configurations. Accordingly, the examples provided should not limit the scope or inhibit the broad teachings of distributed storage system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular tenant-level configuration functions (e.g., applied in a Ceph storage system), these tenant-level configuration functions may be applicable in other distributed storage systems. Also, while the tenant-level configuration functions are particularly suited to distributed storage systems that store data in the form of objects, the teachings herein may also be applied to distributed storage systems that store data in various other types of structures including, but not limited to, files and blocks.

Finally, it is also important to note that the operations in the preceding flowcharts illustrate only some of the possible scenarios and patterns that may be executed in association with addressing tenant configuration operations in a distributed storage system. Some of these operations may be deleted, removed, combined, or divided where appropriate, or may be modified or changed considerably without departing from the scope of the present disclosure. In addition, a number of these operations have been described as being executed before, after, concurrently with, or in parallel to, one or more additional operations. However, the timing of these operations may be altered considerably. The preceding operational flows have been offered for purposes of example and discussion. Distributed storage system 100, including administration host 10, may provide substantial flexibility in that any suitable arrangements, chronologies, configurations, and timing mechanisms may be provided without departing from the teachings of the present disclosure.

What is claimed is:

1. A method comprising:
receiving an indication of one or more data storage modules to be assigned to only one tenant of a plurality of tenants of a distributed storage system;
selecting a partition of a disk to be dedicated to the tenant, the selecting based, at least in part, on one or more tenant-specific policies of the tenant, the one or more tenant-specific policies related to at least one requirement of the tenant including at least one of a performance requirement of disks that store data of the tenant, a distribution requirement for the data of the tenant, or a replication requirement for the data of the tenant;
allocating the partition for the data of the tenant;
assigning a first data storage module of the one or more data storage modules to the partition;
assigning the first data storage module to the tenant; and
creating rules for the first data storage module based on the one or more tenant-specific policies configured for the tenant, wherein the rules indicate how the first data storage module is to store the data of the tenant in the partition and how the first data storage module is to access stored data in the partition,
wherein,
the one or more tenant-specific policies are related to the distribution requirement for h data and the replication requirement for the data,
the replication requirement is a number of replicas desired for a portion of the data, and
the distribution requirement is how far apart or how close together the replicas can be stored relative to each other.

2. The method of claim 1, further comprising:
receiving an indication of a type of subscription model selected for the tenant.

3. The method of claim 2, wherein the subscription model selected for the tenant includes a tenant-specific policy of the one or more tenant-specific policies used to select the partition.

4. The method of claim 1, wherein the first data storage module stores at least some data of the tenant in the partition based, at least in part, on the rules.

5. The method of claim 1, further comprising:
generating a storage map indicating the assignment of the first data storage module to the partition and indicating the assignment of the data storage module to the tenant.

6. The method of claim 5, further comprising:
generating a unique identifier of the data storage module, wherein the unique identifier of the data storage module is mapped to the tenant in the storage map, and wherein the unique identifier is not mapped to any other tenants in the storage map.

7. The method of claim 5, wherein the storage map includes: a mapping of a unique identifier of the first data storage module to the tenant; and a mapping of the unique identifier of the first data storage module to the partition.

8. The method of claim 1, wherein one or more other partitions of the disk are associated with one or more other data storage modules, respectively, and wherein the one or more other data storage modules are associated with one or more other tenants, respectively, of the distributed storage system.

9. The method of claim 1,
wherein,
the distribution requirement is how close together the replicas can be stored relative to each other.

10. The method claim 1, further comprising:
selecting a second partition of the disk to be dedicated to the tenant;
allocating the second partition for other data of the tenant;
assigning a second data storage module of the one or more data storage modules to the second partition;
assigning the second data storage module to the tenant; and
creating other rules for the second data storage module based on one or more other tenant-specific policies configured for storing the other data of the tenant.

11. At least one non-transitory machine readable storage medium comprising instructions that, when executed by at least one processor, cause the at least one processor to:
receive an indication of one or more data storage modules to be assigned to only one tenant of a plurality of tenants of a distributed storage system;
select a partition of a disk to be dedicated to the tenant based, at least in part, on one or more tenant-specific policies of the tenant, the one or more tenant-specific policies related to at least one requirement of the tenant including at least one of a performance requirement of disks that store data of the tenant, a distribution requirement for the data of the tenant, or a replication requirement for the data of the tenant;

allocate the partition for the data of the tenant;

assign a first data storage module of the one or more data storage modules to the partition;

assigning the first data storage module to the tenant; and create rules for the first data storage module based on the one or more tenant-specific policies configured for the tenant, wherein the rules indicate how the first data storage module is to store the data of the tenant in the partition and how the first data storage module is to access stored data in the partition, wherein, the one or more tenant-specific policies are related to the distribution requirement for the data and the replication requirement for the data, the replication requirement is a number of replicas desired for a portion of the data, and the distribution requirement is how far apart or how close together the replicas can be stored relative to each other.

12. The at least one non-transitory machine readable storage medium of claim 11, wherein the instructions when executed by the at least one processor cause the at least one processor to:

receive an indication of a type of subscription model selected for the tenant.

13. The at least one non-transitory machine readable storage medium of claim 12, wherein the subscription model selected for the tenant includes a tenant-specific policy of the one or more tenant-specific policies used to select the partition.

14. The at least one non-transitory machine readable storage medium of claim 11, wherein the first data storage module stores at least some data of the tenant in the partition based, at least in part, on the rules.

15. The at least one non-transitory machine readable storage medium of claim 11, wherein the instructions when executed by the at least one processor cause the at least one processor to:

generate a storage map indicating the assignment of the first data storage module to the partition and indicating the assignment of the first data storage module to the tenant.

16. An apparatus comprising:

at least one processor; and at least one memory element comprising instructions that when executed by the at least one processor perform operations comprising:

receiving an indication of one or more data storage modules to be assigned to only one tenant of a plurality of tenants of a distributed storage system;

selecting a partition of a disk to be dedicated to the tenant, the selecting based, at least in part, on one or more tenant-specific policies of the tenant, the one or more tenant-specific policies related to at least one requirement of the tenant including at least one of a performance requirement of disks that store data of the tenant, a distribution requirement for the data of the tenant, and a replication requirement for the data of the tenant;

allocating the partition of the disk for the data of the tenant;

assigning a first data storage module of the one or more data storage modules to the partition;

assigning the first data storage module to the tenant; and creating rules for the first data storage module based on the one or more tenant-specific policies configured for the tenant, wherein the rules indicate how the first data storage module is to store the data of the tenant in the partition and how the first data storage module is to access stored data in the partition, wherein, the one or more tenant-specific policies are related to the distribution requirement for the data and the replication requirement for the data, the replication requirement is a number of replicas desired for a portion of the data, and the distribution requirement is how far apart or how close together the replicas can be stored relative to each other.

17. The apparatus of claim 16, wherein the instructions when executed by the at least one processor cause the apparatus to:

generating a unique identifier of the first data storage module, wherein the unique identifier of the first data storage module is mapped to the tenant in a storage map, and wherein the unique identifier is not mapped to any other tenants in the storage map.

18. The apparatus of claim 16, wherein the data includes one of objects, files or blocks.

19. The apparatus of claim 16, wherein one or more other data storage modules are assigned to one or more other partitions of the disk, respectively, and wherein the one or more other data storage modules are assigned to one or more other tenants, respectively, of the distributed storage system.

20. The apparatus of claim 16, wherein the distributed storage system includes a storage cluster with at least one metadata server configured to store metadata associated with objects.

* * * * *